US012620385B2

(12) United States Patent
Miller

(10) Patent No.: US 12,620,385 B2
(45) Date of Patent: May 5, 2026

(54) LOW LATENCY AUDIO PROCESSING SYSTEM HAVING ACTIVE NOISE CANCELLATION FOR EAR-WORN HEARING DEVICE

(71) Applicant: Knowles Electronics, LLC, Itasca, IL (US)

(72) Inventor: Thomas E. Miller, Arlington Heights, IL (US)

(73) Assignee: Knowles Electronics, LLC, Itasca, IL (US)

( * ) Notice: Subject to any disclaimer, the term of this patent is extended or adjusted under 35 U.S.C. 154(b) by 436 days.

(21) Appl. No.: 18/131,686

(22) Filed: Apr. 6, 2023

(65) Prior Publication Data

US 2024/0339099 A1 Oct. 10, 2024

(51) Int. Cl.

| | |
|---|---|
| ***H04R 19/02*** | (2006.01) |
| ***G10K 11/178*** | (2006.01) |
| ***H04R 1/10*** | (2006.01) |

(52) U.S. Cl.

CPC .. *G10K 11/17823* (2018.01); *G10K 11/17825* (2018.01); *G10K 11/17881* (2018.01); *H04R 1/1041* (2013.01); *H04R 1/1075* (2013.01); *H04R 1/1083* (2013.01); *H04R 19/02* (2013.01); *G10K 2210/1081* (2013.01); *G10K 2210/3026* (2013.01); *G10K 2210/3027* (2013.01); *G10K 2210/3044* (2013.01); *H04R 2201/003* (2013.01); *H04R 2460/01* (2013.01)

(58) Field of Classification Search

CPC ... H04R 1/1016; H04R 25/453; H04R 25/505
USPC ........................................................ 381/71.6
See application file for complete search history.

(56) References Cited

U.S. PATENT DOCUMENTS

| | | | | |
|---|---|---|---|---|
| 2019/0272814 | A1* | 9/2019 | Park | G10K 11/17854 |
| 2023/0101608 | A1* | 3/2023 | Lutz | H04R 19/02 381/71.1 |
| 2023/0300516 | A1* | 9/2023 | Betlehem | H04R 25/505 381/71.6 |

* cited by examiner

*Primary Examiner* — Carolyn R Edwards
*Assistant Examiner* — Friedrich Fahnert
(74) *Attorney, Agent, or Firm* — Flener IP & Business Law

(57) ABSTRACT

An ear-worn hearing device includes a speaker disposed in a housing comprising a portion configured for wear over, on, or at least partially in a canal of a user's ear. Microphones are integrated with the housing, and a digital signal processing chain is coupled to and located between the microphones and the speaker. The digital signal processing chain includes active noise cancellation (ANC) circuitry configured to generate an anti-noise signal, and speaker-performance-enhancement circuitry coupled to the ANC circuitry and configured to generate a signal based on the anti-noise signal for the speaker. The digital signal processing chain is configured to communicate audio signals between the ANC circuitry and the speaker-performance-enhancement circuitry without changing a format of the audio signals.

13 Claims, 3 Drawing Sheets

LOW LATENCY AUDIO PROCESSING SYSTEM HAVING ACTIVE NOISE CANCELLATION FOR EAR-WORN HEARING DEVICE

FIELD OF THE DISCLOSURE

The present disclosure relates generally to an audio signal processing system, and more particularly to reduced latency in an audio signal processing system comprising active noise cancellation for ear-worn hearing devices, and combinations thereof.

BACKGROUND

Active noise cancellation (ANC) systems in ear-worn hearing devices are known to function optimally when there is little or no latency between audio input and output signals of the ANC system. However, the signal processing architectures of some ear-worn hearing devices have too much latency for effective noise cancellation. The latency in these and other audio systems is attributable to a serial processing of the audio signal. In one such hearing device, the signal processor comprises ANC circuitry combined with pre-distortion circuitry that compensates for non-linearity in a transfer characteristic of the speaker. The non-linearity may be inherent or result from driving the speaker beyond its linear operating range. Pre-distortion generally improves sound quality for a given level of sound output and can compensate for non-linearity in microelectromechanical systems (MEMS) and other speakers. Improved linearity can improve ANC performance. In other applications, latency can be attributable to the ANC circuit combined with other circuits that improve speaker performance. Thus, there is an ongoing need for latency improvements in audio signal processing systems suitable for ear-worn hearing devices and other applications.

Figure 1:
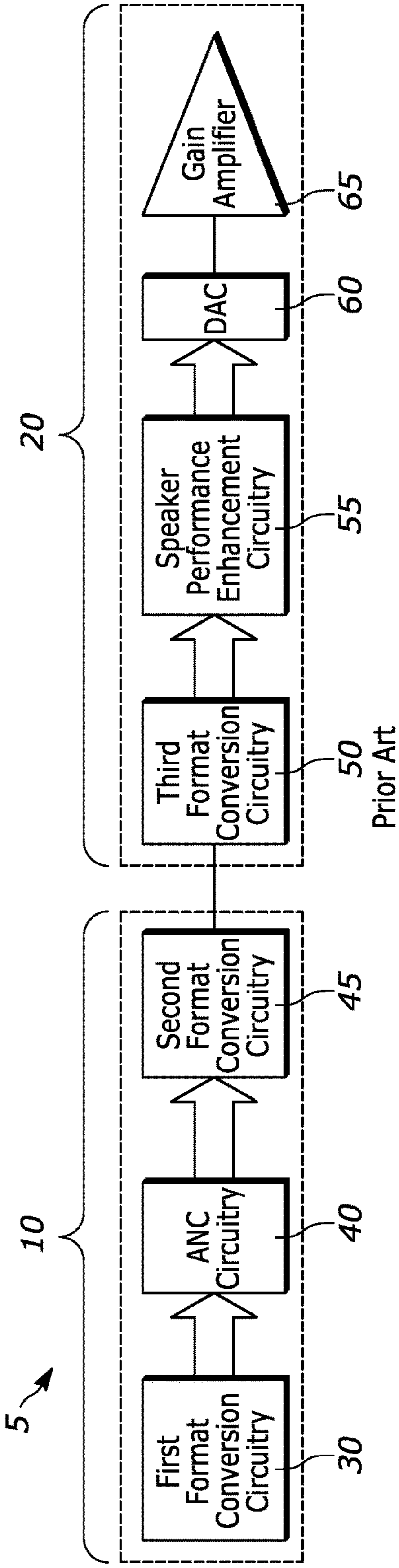
Prior Art FIG. 1
FIG. 1 is schematic block diagram of an exemplary prior art ANC system.

Those of ordinary skill in the art will appreciate that elements in the figures are illustrated for simplicity and clarity. It will be appreciated further that certain actions and/or steps may be described or depicted in a particular order of occurrence while those having ordinary skill in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

According to an aspect of the disclosure, an ear-worn hearing device comprises a speaker disposed in a housing comprising a portion configured for wear over, on, or at least partially in a canal of a user's ear. In an embodiment microphones are integrated with the housing, and a digital signal processing chain is coupled to and located between the microphones and the speaker. In an embodiment the digital signal processing chain comprises active noise cancellation (ANC) circuitry configured to generate an anti-noise signal, and speaker-performance-enhancement circuitry coupled to the ANC circuitry and configured to generate a signal based on the anti-noise signal for the speaker, wherein the digital signal processing chain is configured to communicate audio signals between the ANC circuitry and the speaker-performance-enhancement circuitry without changing a format of the audio signals. In an embodiment the digital signal processing chain is configured to communicate pulse code modulation format signals, among others, between the ANC circuitry and the speaker-performance-enhancement circuitry.

In an embodiment the ANC circuitry and the speaker-performance-enhancement circuitry are integrated on a common die. In an embodiment the ear-worn hearing device further comprises driver circuitry coupled to and located between the speaker-performance-enhancement circuitry and the speaker, and a digital-to-analog converter coupled to and located between the speaker-performance-enhancement circuitry and the driver circuitry, wherein the driver circuitry applies the signal from the speaker-performance-enhancement circuitry to the speaker. In an embodiment the speaker-performance-enhancement circuitry is pre-distortion circuitry configured to generate a pre-distortion signal based on an anti-noise signal, wherein the driver circuitry applies the pre-distortion signal to the speaker. In an embodiment the speaker-performance-enhancement circuitry is pre-distortion circuitry configured to generate a pre-distortion signal based on the anti-noise signal, wherein the ANC circuitry and the pre-distortion circuitry are integrated on a common die. In an embodiment the speaker comprises a microelectromechanical systems (MEMS) speaker, among other types of speakers.

According to another aspect of the disclosure, an integrated circuit for an ear-worn hearing device comprising microphones and a speaker, comprises an input signal interface connectable to the microphones when the integrated circuit is assembled with the ear-worn hearing device, an output signal interface connectable to the speaker when the integrated circuit is assembled with the ear-worn hearing device, and a digital signal processing chain coupled to the input signal interface. In an embodiment the digital signal processing chain comprises active noise cancellation (ANC) circuitry configured to generate an anti-noise signal based on feedback and feedforward microphone signals received at the input signal interface, and speaker-performance-enhancement circuitry coupled to and located between the ANC circuitry and the output signal interface, the speaker-performance-enhancement circuitry configured to generate a signal based on the anti-noise signal, wherein the digital signal processing chain is configured to communicate audio signals between the ANC circuitry and the speaker-performance-enhancement circuitry without changing a format of the audio signals. In an embodiment the ANC circuitry and the speaker-performance-enhancement circuitry are integrated on a common die. In an embodiment the digital signal processing chain is configured to communicate pulse code modulation format signals, among others, between the ANC circuitry and the speaker-performance-enhancement circuity.

In an embodiment the integrated circuit further comprises driver circuitry coupled to and located between the speaker-performance-enhancement circuitry and the output signal interface, and a digital-to-analog converter (DAC) coupled to and located between the speaker-performance-enhancement circuitry and the driver circuit, wherein the driver circuit applies the signal from the speaker-performance-enhancement circuitry to the output signal interface. In an embodiment the DAC and the driver circuitry are integrated on the common die. In an embodiment the speaker-performance-enhancement circuitry is pre-distortion circuitry configured to generate a pre-distortion signal based on an anti-noise signal, wherein the driver circuitry applies the pre-distortion signal to the output signal interface. In an embodiment the integrated circuit further comprises signal format conversion circuitry coupled to and located between the input signal interface and the ANC circuitry, wherein the signal format conversion circuitry is integrated on the common die. In an embodiment the integrated circuit is combined with an ear-worn hearing device comprising feedback and feed-forward speakers coupled to the ANC circuitry via the input signal interface, and a microelectromechanical systems (MEMS) speaker is coupled to the pre-distortion circuitry via the output signal interface.

According to a further aspect of the disclosure, an audio processing system having active noise cancellation and pre-distortion, comprises active noise cancellation circuitry and pre-distortion circuitry disposed on a common die, wherein the active noise cancellation circuitry produces pulse code modulated signal output, and pre-distortion circuitry directly receives the pulse code modulated signal output. In an embodiment the audio processing system further comprises a digital to analog converter, wherein the pre-distortion circuitry produces a digital electrical signal output, the digital to analog converter receives the digital electrical signal output, and the digital to analog converter produces a first analog electrical signal output, and an amplifier, wherein the amplifier receives the first analog electrical signal output. In an embodiment the audio processing system further comprises a speaker, wherein the amplifier produces a second analog electrical signal output, and the speaker receives the second analog electrical signal output. In an embodiment the speaker comprises a microelectromechanical systems (MEMS) speaker. In an embodiment the audio processing system further comprises a microphone that outputs a second digital electrical signal output, wherein the active noise circuitry receives the second digital electrical signal output.

Referring to FIG. 1, a prior art ANC system 5 is illustrated in a schematic block diagram. The ANC system 5 is constructed in two separate dies or packaged in two separate integrated circuit packages that include an ANC chip or headphone system on a chip (SOC) indicated at 10 and a speaker amplifier chip indicated at 20.

In the ANC system 5 a digital audio signal is introduced into a first format conversion circuit block 30, for example without limitation, from a microphone or another source. The format of a digital signal is the format of how the digital information is organized for transmission. A digital signal includes one or more binary bits of information that can be formatted serially into a stream of individual bits or that can be combined into words consisting of multiple bits. The format of the data being transmitted affects how that data is transferred. For example, the pulse code modulation (PCM) format utilizes words of data that can be organized and transmitted in parallel across multiple wires. In contrast, formats that utilize a single bit that is serially transmitted utilize a single wire to transmit the data. Exemplary digital data formats utilizing a single wire include pulse density modulation (PDM), time division multiplex (TDM), inter integrated circuit sound (I2C), and pulse width modulation (PWM) formats, among other known and future formats.

The first format conversion circuit block 30 typically performs a conversion of the format of the digital audio signal as input into it to a format that can be received by ANC circuitry 40. For example, in some systems the digital audio signal is converted from a pulse density modulated (PDM) signal to a pulse code modulated (PCM) signal by the first format conversion circuit block 30. The digital audio signal is received by the ANC circuitry 40, which is configured to generate and output an anti-noise signal based on the signal received from the first format conversion block 30.

Still referring to prior art FIG. 1, the anti-noise signal output by the ANC circuitry 40 is introduced into a second format conversion circuit block 45. The second format conversion circuit block 45 typically performs a conversion of the format of the digital audio signal as input into it to a format that can be received by speaker amplifier circuitry disposed within the speaker amplifier chip 20. For example, in some systems the digital audio signal is converted from a PCM signal back to a PDM signal by the second format conversion circuit block 45.

Still referring to prior art FIG. 1 and following the digital audio signal from left to right, the digital audio signal, now formatted as a PDM signal, is transmitted from the ANC chip 10 to the amplifier chip 20 and is introduced into a third format conversion circuit block 50. The third format conversion circuit block 50 typically performs a conversion of the format of the digital audio signal as input into it to a format that can be received by speaker-performance-enhancement circuitry 55, which is configured to generate and output a signal based on the anti-noise signal in the format output by the third format conversion circuit block 50. The performance enhanced digital signal is converted to an analog signal at digital to analog converter (DAC) block 60, and is then passed to a gain amplifier at block 65 before being passed to a speaker (see FIG. 2).

Figure 2:
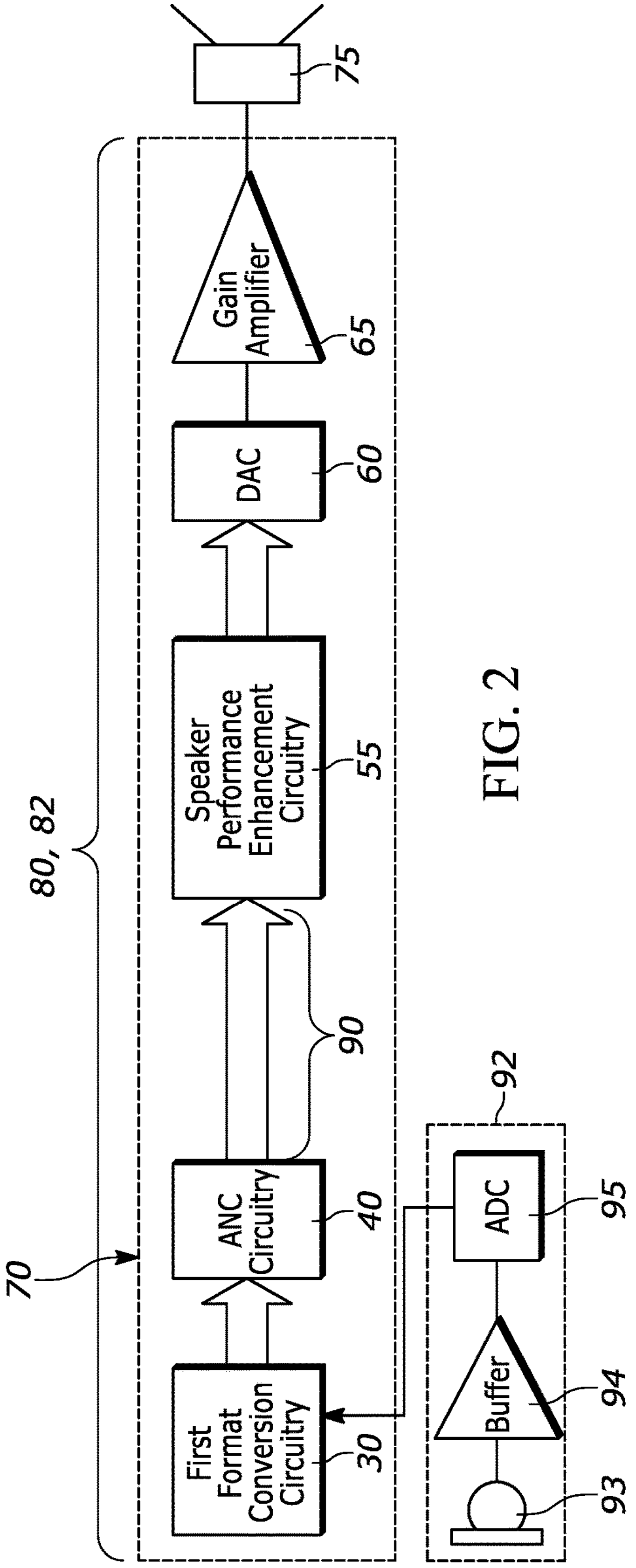
FIG. 2 is a schematic block diagram of a representative audio processing system according to the present disclosure.

Referring to FIG. 2, an exemplary embodiment of an audio processing system 70 includes some but not all of the circuit blocks present in the prior art ANC system 5, wherein circuit blocks having the same functionality are presented using the same reference numerals. As can be seen by direct comparison of FIGS. 1 and 2, the audio processing system 70 lacks the second and third format conversion blocks 45 and 50. In an embodiment of the audio processing system 70, the ANC circuitry 40 and the speaker-performance-enhancement circuitry 55 are disposed on a common die 80 or packaged within a common integrated circuit 82. In an embodiment of the audio processing system 70, the ANC circuitry 40 produces PCM signal output, and the speaker-performance-enhancement circuitry 55 directly receives the PCM signal output without any operation of the missing second and third format conversion blocks 45 and 50.

Each of the second and third format conversion blocks 45 and 50 requires time to process the digital audio signal therethrough, which adds latency to the anti-noise signal output by the ANC circuitry 40. As noted above, added latency is detrimental to optimum ANC performance. However, the lack of the second and third format conversion blocks 45 and 50 provides for a direct transmission of the digital audio signal, as indicated by bracketed arrow 90 in FIG. 2, between the ANC circuitry 40 and the speaker-performance-enhancement circuitry 55. This direct transmission 90 provides a functional advantage for the audio processing system 70 over the prior art ANC system 5, wherein that functional advantage is a reduced signal latency.

In an embodiment of the audio processing system 70, the speaker-performance-enhancement circuitry 55 is a pre-distortion circuitry 55 that operates to improve sound quality for a given level of sound output by compensating for non-linearity in the speaker 75 receiving the signal. In other embodiments, the speaker-performance-enhancement circuitry 55 operates on the signal received from the ANC circuitry 40, for example without limitation, to apply a DC offset, gain calibration, equalization, or signal level-dependent equalization. In some embodiments the level of DC offset, gain calibration, or equalization is related to time-varying conditions such as temperature, humidity, or the acoustics of objects connected to the front or back of the speaker 75 (for example to an earphone housing 230, ear tips (not shown), ear canal 210, etc.—see FIG. 3). In an embodiment of the audio processing system 70, the speaker-performance-enhancement circuitry 55 is included with the packaging of the speaker 75 to which it connects, which is advantageous because that allows the speaker-performance-enhancement circuitry 55 to be supplied by the maker of the speaker 75, who ideally would have more complete knowledge of what processing is appropriate for a particular speaker, perhaps including being individually-calibrated.

Still referring to FIG. 2 and following the digital audio signal from left to right, the digital audio signal output from the speaker-performance-enhancement circuitry 55 is passed to the digital to analog converter (DAC) 60, wherein the DAC 60 produces an analog electrical signal output. A gain amplifier 65 receives the analog electrical signal and amplifies it for delivery to the speaker 75. In an embodiment of the audio processing system 70, the speaker 75 comprises a microelectromechanical systems (MEMS) speaker. Still referring to FIG. 2, in an embodiment the audio processing system 70 comprises a microphone 93 or a microphone assembly 92 that outputs a digital audio signal to the first format conversion circuit block 30. In an embodiment the microphone assembly includes, for example without limitation, the microphone 93, an amplifier or buffer 94, and an analog to digital converter (ADC) 95.

Figure 3:
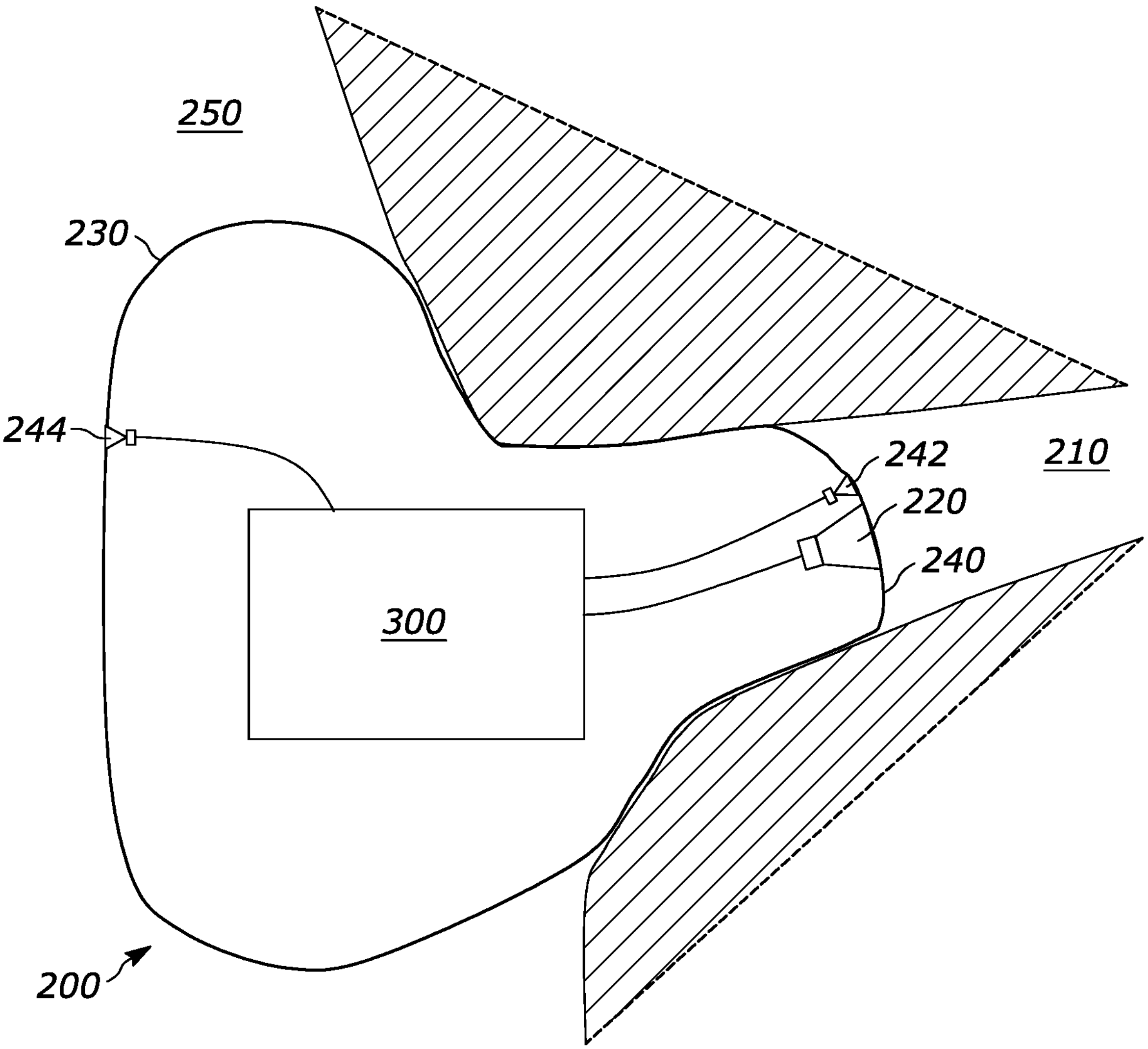
FIG. 3 is a schematic diagram of a representative ear-worn hearing device shown inserted into a user's ear.

Referring to FIG. 3 an exemplary ear-worn hearing device 200 is schematically illustrated as transparent and inserted into an ear canal 210 of a user. In some embodiments the ear-worn hearing device 200 is supported within the ear canal 210 as shown by friction resulting from a press fit into the ear canal 210. In other embodiments the ear-worn hearing device 200 includes a strap or an ear loop or additional structure (not shown) to help prevent it from falling out of the ear canal 210.

As illustrated in FIG. 3, in an embodiment the ear-worn hearing device 200 comprises a speaker 220 disposed in a housing 230 comprising a portion 240 configured for wear over, on, or at least partially in a canal 210 of a user's ear. In an embodiment microphones 242, 244, for example without limitation, feedback microphone 242 and feedforward microphone 244 are integrated within the housing 230. One of the microphones 242, for example the feedback microphone 242, is positioned, oriented, or directed to receive sound from within the ear canal 210 and the other microphone 244, for example the feedforward microphone 244, is positioned, oriented, or directed to receive sound from the environment 250 surrounding the user. In an embodiment a digital signal processing chain 300 is coupled to and located between the microphones 242, 244 and the speaker 220.

Figure 4:
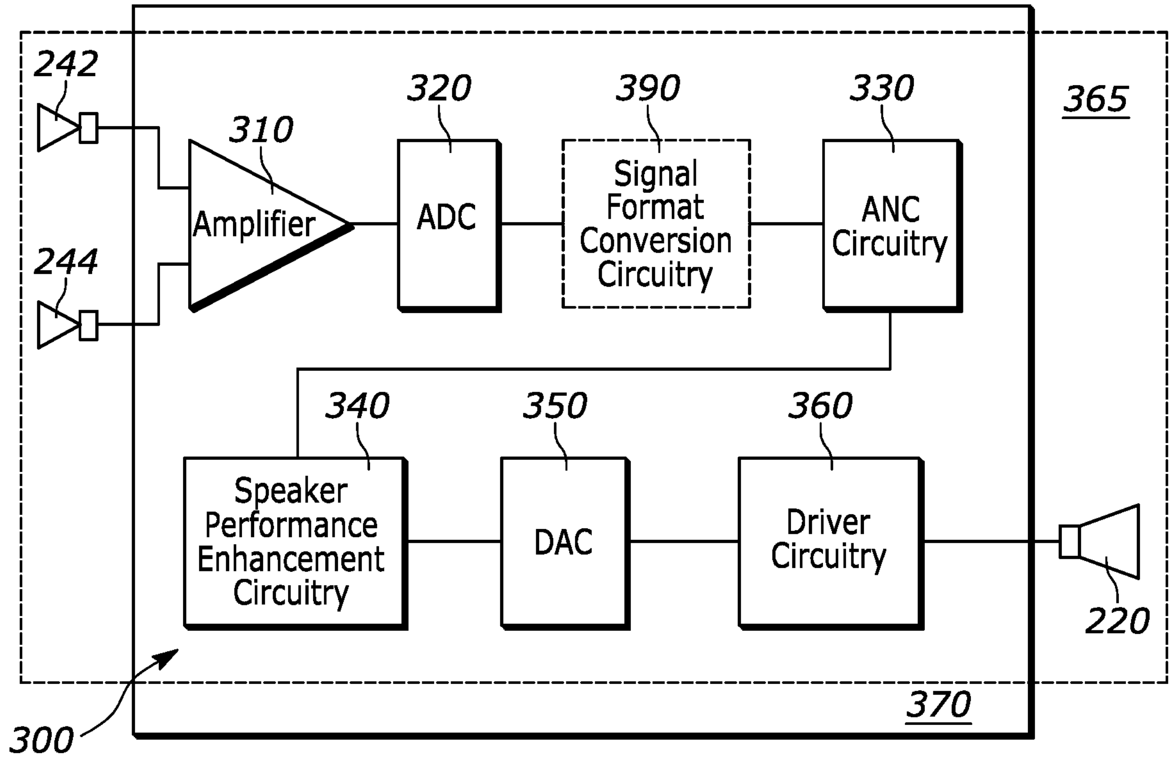
FIG. 4 is a schematic block diagram of a representative digital signal processing chain illustrated as part of an integrated circuit.
Figure 5:
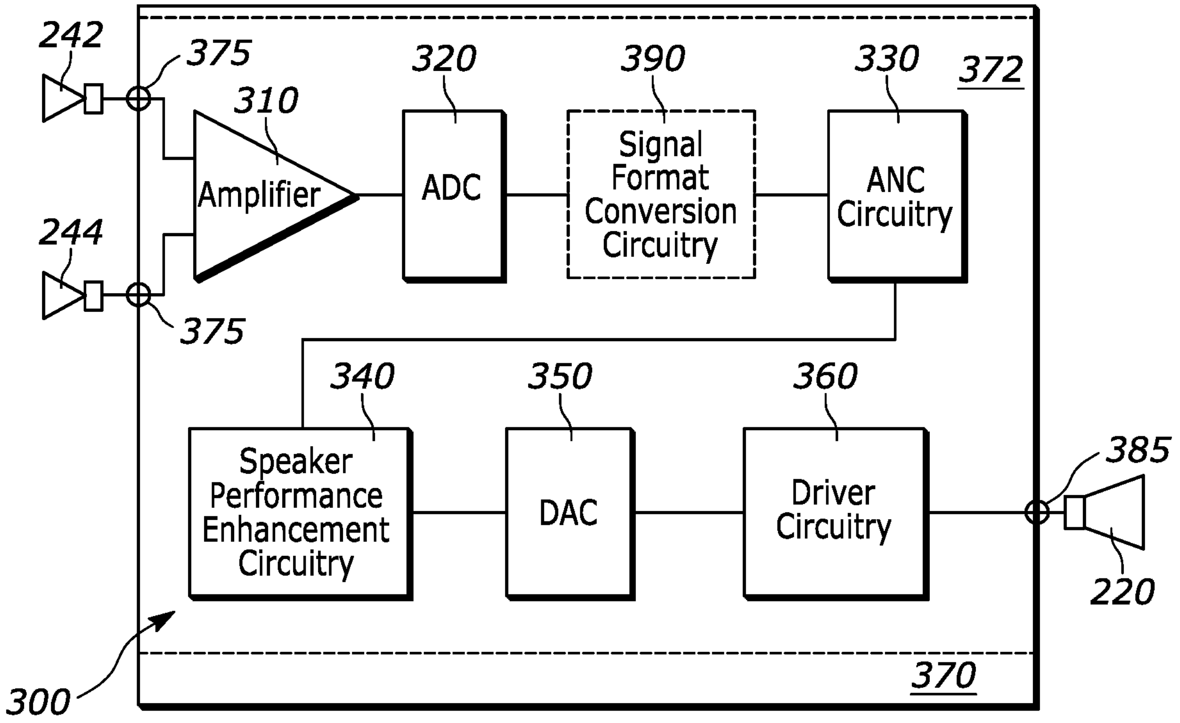
FIG. 5 is a schematic block diagram of another representative digital signal processing chain illustrated as part of an integrated circuit.

Referring to FIGS. 4 and 5, in an embodiment the digital signal processing chain 300 includes an amplifier 310 that receives analog audio electrical signals from the microphones 242, 244. In an embodiment of the digital signal processing chain 300, the amplifier 310 outputs an analog signal to an analog to digital converter (ADC) 320 that converts the analog signal to a digital signal and passes it along to ANC circuitry 330. In an embodiment of the digital signal processing chain 300, the ANC 330 outputs an anti-noise digital signal to speaker-performance-enhancement circuitry 340, which outputs an enhanced digital signal to a DAC 350. In an embodiment of the digital signal processing chain 300, the DAC 350 outputs an analog audio signal to driver circuitry 360 that drives the speaker 220. In an embodiment of the digital signal processing chain 300, the digital signal processing chain 300 or at least some components thereof are disposed within an integrated circuit 365 or 372, that are described more fully hereinbelow.

In an embodiment the digital signal processing chain 300 comprises speaker-performance-enhancement circuitry 340, for example without limitation, pre-distortion circuitry 340 coupled to ANC circuitry 330 and configured to generate a signal based on the anti-noise signal for the speaker 220. In an embodiment the digital signal processing chain 300 is configured to communicate audio signals between the ANC circuitry 330 and the speaker-performance-enhancement circuitry 340 without changing a format of the audio signals. In an embodiment of the digital signal processing chain 300, the driver circuitry 360 is coupled to and located between the speaker-performance-enhancement circuitry 340 and the speaker 220. In an embodiment of the digital signal processing chain 300, a DAC 350 is coupled to and located between the speaker-performance-enhancement circuitry 340 and the driver circuitry 360, wherein the driver circuitry 360 applies the signal from the speaker-performance-enhancement circuitry 340 to the speaker 220.

In an embodiment of the digital signal processing chain 300, the speaker-performance-enhancement circuitry 340, for example without limitation, pre-distortion circuitry 340 is configured to generate a pre-distortion signal based on the anti-noise signal, wherein the driver circuitry 360 applies the pre-distortion signal to the speaker 220. In an embodiment the digital signal processing chain 300 is configured to communicate PCM format signals between the ANC circuitry 330 and the speaker-performance-enhancement circuitry 340. In an embodiment of the digital signal processing chain 300, the ANC circuitry 330 and the pre-distortion circuitry 340 are integrated on a common die 370 (see FIG. 4). In an embodiment of the digital signal processing chain 300, the speaker 220 comprises a microelectromechanical systems (MEMS) speaker 220.

Referring to FIG. 4, in an embodiment an integrated circuit 365 for an ear-worn hearing device 200 comprises the microphones 242, 244, and the speaker 220. Referring to FIGS. 4 and 5, in another embodiment an integrated circuit 372 comprises the digital signal processing chain 300, an input signal interface 375, and an output signal interface 385, but not the microphones 242, 244, and the speaker 220.

In an embodiment the integrated circuit 372 comprises an input signal interface 375 connectable to the microphones 242, 244 when the integrated circuit 372 is assembled with the ear-worn hearing device 200 and an output signal interface 385 connectable to the speaker 220 when the integrated circuit 372 is assembled with the ear-worn hearing device 200. In an embodiment the integrated circuit 372 comprises the digital signal processing chain 300 coupled to the input signal interface 375, wherein the digital signal processing chain 300 comprises active noise cancellation (ANC) circuitry 330 configured to generate an anti-noise signal based on feedback and feedforward microphone 242, 244 signals received at the input signal interface 375. In an embodiment of the integrated circuit 372, the speaker-performance-enhancement circuitry 340 is coupled to and located between the ANC circuitry 330 and the output signal interface 385, and the speaker-performance-enhancement circuitry 340 is configured to generate a signal based on the anti-noise signal, wherein the digital signal processing chain 300 is configured to communicate audio signals between the ANC circuitry 330 and the speaker-performance-enhancement circuitry 340 without changing a format of the audio signals.

All descriptions of either embodiment of the integrated circuits 365 and 372 not involving the microphones 242, 244, the speaker 220, the input signal interface 375 or the output signal interface 385 are equally applicable to both embodiments. In either embodiment of the integrated circuit 365 or 372, the ANC circuitry 330 and the speaker-performance-enhancement circuitry 340 are integrated on a common die. In either embodiment of the integrated circuit 365 or 372, the digital signal processing chain 300 can be configured to communicate PCM format signals between the ANC circuitry 330 and the speaker-performance-enhancement circuity 340.

In an embodiment the integrated circuit 372 further comprises driver circuitry 360 coupled to and located between the speaker-performance-enhancement circuitry 340 and the output signal interface 385, and a DAC 350 coupled to and located between the speaker-performance-enhancement circuitry 340 and the driver circuitry 360, wherein the driver circuitry 360 applies the signal from the speaker-performance-enhancement circuitry 340 to the output signal interface 385. In either embodiment of the integrated circuit 365 or 372, the DAC 350 and the driver circuitry 360 can be integrated on the common die 370. In an embodiment of the integrated circuit 372, the speaker-performance-enhancement circuitry 340 comprises pre-distortion circuitry 340 configured to generate a pre-distortion signal based on the anti-noise signal, wherein the driver circuitry 360 applies the pre-distortion signal to the output signal interface 385.

In either embodiment of the integrated circuit 365 or 372, signal format conversion circuitry 390 shown by the dashed rectangles in FIGS. 4 and 5, is coupled to and located between the input signal interface 375 and the ANC circuitry 330, wherein the signal format conversion circuitry 390 is integrated on the common die 370. Either embodiment of the integrated circuit 365 or 375 can be combined with an ear-worn hearing device 200 comprising feedback and feedforward speakers 242, 244 coupled to the ANC circuitry 330 via the input signal interface 375, and a microelectromechanical systems (MEMS) speaker 220 coupled to the pre-distortion circuitry 340 via the output signal interface 385.

While the disclosure and what is presently considered to be the best mode thereof has been described in a manner that establishes possession by the inventor and that enables those of ordinary skill in the art to make and use the same, it will be understood and appreciated that there are many equivalents to the embodiments disclosed herein and that myriad modifications and variations may be made thereto without departing from the scope and spirit of the invention, which are to be limited not by the exemplary embodiments but by the appended claims and their equivalents.

What is claimed is:

1. An ear-worn hearing device comprising:

a speaker disposed in a housing comprising a portion configured for wear over, on, or at least partially in a canal of a user's ear;

a microphone integrated with the housing;

a digital signal processing chain coupled to and located between the microphone and the speaker, the digital signal processing chain comprising:

active noise cancellation (ANC) circuitry configured to generate an anti-noise signal based on a microphone signal; and speaker-performance-enhancement circuitry coupled to the ANC circuitry and configured to generate a signal based on the anti-noise signal for the speaker, wherein the digital signal processing chain is configured to communicate audio signals between the ANC circuitry and the speaker-performance-enhancement circuitry without changing a format of the audio signals; and wherein the speaker-performance-enhancement circuitry is pre-distortion circuitry configured to generate a pre-distortion signal based on the anti-noise signal, wherein the ANC circuitry and the pre-distortion circuitry are integrated on a common die.

2. The ear-worn hearing device of claim 1, wherein the digital signal processing chain is configured to communicate pulse code modulation format signals between the ANC circuitry and the speaker-performance-enhancement circuitry.

3. The ear-worn hearing device of claim 1, further comprising:

driver circuitry coupled to and located between the speaker-performance-enhancement circuitry and the speaker; and a digital-to-analog converter coupled to and located between the speaker-performance-enhancement circuitry and the driver circuitry, wherein the driver circuitry applies the signal from the speaker-performance-enhancement circuitry to the speaker.

4. The ear-worn hearing device of claim 3, wherein the driver circuitry applies the pre-distortion signal to the speaker.

5. The ear-worn hearing device of claim 1, wherein the speaker comprises a microelectromechanical systems (MEMS) speaker.

6. An integrated circuit for an ear-worn hearing device comprising microphones and a speaker, the integrated circuit comprising:

an input signal interface connectable to the microphones when the integrated circuit is assembled with the ear-worn hearing device;

an output signal interface connectable to the speaker when the integrated circuit is assembled with the ear-worn hearing device;

a digital signal processing chain coupled to the input signal interface and comprising:

active noise cancellation (ANC) circuitry configured to generate an anti-noise signal based on feedback and feedforward microphone signals received at the input signal interface; and speaker-performance-enhancement circuitry coupled to and located between the ANC circuitry and the output signal interface, the speaker-performance-enhancement circuitry configured to generate a signal based on the anti-noise signal, wherein the digital signal processing chain is configured to communicate audio signals between the ANC circuitry and the speaker-performance-enhancement circuitry without changing a format of the audio signals, wherein the ANC circuitry and the speaker-performance-enhancement circuitry are integrated on a common die, and wherein the digital signal processing chain is configured to communicate pulse code modulation format signals between the ANC circuitry and the speaker-performance-enhancement circuitry;

driver circuitry coupled to and located between the speaker-performance-enhancement circuitry and the output signal interface; and a digital-to-analog converter (DAC) coupled to and located between the speaker-performance-enhancement circuitry and the driver circuit, wherein the driver circuit applies the signal from the speaker-performance-enhancement circuitry to the output signal interface.

7. The integrated circuit of claim 6, wherein the DAC and the driver circuitry are integrated on the common die.

8. The integrated circuit of claim 7, the speaker-performance-enhancement circuitry is pre-distortion circuitry configured to generate a pre-distortion signal based on the anti-noise signal, wherein the driver circuitry applies the pre-distortion signal to the output signal interface.

9. The integrated circuit of claim 8 further comprising signal format conversion circuitry coupled to and located between the input signal interface and the ANC circuitry, wherein the signal format conversion circuitry is integrated on the common die.

10. The integrated circuit of claim 9 in combination with an ear-worn hearing device comprising feedback and feed-forward speakers coupled to the ANC circuitry via the input signal interface, and a microelectromechanical systems (MEMS) speaker coupled to the pre-distortion circuitry via the output signal interface.

11. An audio processing system having active noise cancellation and pre-distortion, the system comprising:

active noise cancellation circuitry and pre-distortion circuitry disposed on a common die, wherein the active noise cancellation circuitry produces pulse code modulated signal output, and the pre-distortion circuitry directly receives the pulse code modulated signal output;

a digital to analog converter, wherein the pre-distortion circuitry produces a digital electrical signal output, the digital to analog converter receives the digital electrical signal output, and the digital to analog converter produces a first analog electrical signal output;

an amplifier, wherein the amplifier receives the first analog electrical signal output; and a speaker, wherein the amplifier produces a second analog electrical signal output, and the speaker receives the second analog electrical signal output.

12. The audio processing system of claim 11, wherein the speaker comprises a microelectromechanical systems (MEMS) speaker.

13. The audio processing system of claim 11, further comprising a microphone that outputs a second digital electrical signal output, wherein the active noise circuitry receives the second digital electrical signal output.

* * * * *